(12) United States Patent  (10) Patent No.: US 7,957,113 B2
Yamamoto  (45) Date of Patent: Jun. 7, 2011

(54) UNDERVOLTAGE LOCKOUT CIRCUIT

(75) Inventor: Masahiro Yamamoto, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 576 days.

(21) Appl. No.: 12/049,811

(22) Filed: Mar. 17, 2008

(65) Prior Publication Data
US 2008/0247110 A1 Oct. 9, 2008

(30) Foreign Application Priority Data

Apr. 4, 2007 (JP) ................... 2007-098444

(51) Int. Cl.
*H02H 3/24* (2006.01)
(52) U.S. Cl. ........................................ 361/92
(58) Field of Classification Search ........ 361/92
See application file for complete search history.

(56) References Cited

U.S. PATENT DOCUMENTS

| | | | | |
|---|---|---|---|---|
| 4,473,861 A | * | 9/1984 | Kosak et al. | 361/152 |
| 5,465,188 A | * | 11/1995 | Pryor et al. | 361/18 |
| 5,548,220 A | * | 8/1996 | Kawamoto et al. | 324/399 |
| 5,621,296 A | * | 4/1997 | Werner et al. | 318/768 |
| 7,652,615 B2 | * | 1/2010 | Thomas et al. | 342/68 |
| 2006/0282703 A1 | * | 12/2006 | Nam | 714/14 |
| 2008/0247110 A1 | * | 10/2008 | Yamamoto | 361/92 |
| 2009/0052653 A1 | * | 2/2009 | Ding et al. | 379/401 |

FOREIGN PATENT DOCUMENTS

JP 5-203684 8/1993

* cited by examiner

*Primary Examiner* — Ronald W Leja
(74) *Attorney, Agent, or Firm* — Oblon, Spivak, McClelland, Maier & Neustadt, L.L.P.

(57) ABSTRACT

An objective is to provide a highly-reliable undervoltage lockout circuit which can block and permit normal gate-driver output even when a supply voltage steeply increases. The undervoltage lockout circuit includes a reference-voltage circuit for outputting a reference voltage, a monitor-voltage circuit for outputting a monitor voltage, and a comparator for outputting, the reference voltage and the monitor voltage being inputted thereto, a high/low signal, according to a comparison result of the reference voltage and the monitor voltage, in which the time constant of the monitor-voltage circuit for determining an increasing rate of the monitor voltage is set higher than that of the reference-voltage circuit for determining that of the reference voltage.

11 Claims, 15 Drawing Sheets

UNDERVOLTAGE LOCKOUT CIRCUIT

BACKGROUND OF THE INVENTION

1. Field of the Invention

The present invention relates to undervoltage lockout circuits, and especially relates to an undervoltage lockout circuit for a gate driver that drives a MOSFET (metal oxide semiconductor field effect transistor) or an IGBT (insulated gate bipolar transistor).

2. Description of the Related Art

A gate driver that drives a MOSFET or an IGBT is generally provided with an undervoltage-lockout function (UV function) of blocking off its output when a supply voltage ($V_{CC}$) decreases lower than a predetermined voltage, in order to prevent loss from increasing in the MOSFET or the IGBT.

An undervoltage lockout circuit having such an undervoltage lockout function is illustrated in FIG. 12, in which a configuration equivalent to, for example, that of Japanese Laid-Open Patent Publication No. 1993-203684 (in FIG. 2) is disclosed. In FIG. 12, numeral 101 denotes a comparator. Numeral 102 denotes a Zener diode, whose cathode is connected to the non-inverting input terminal of the comparator 101, while its anode is connected to ground. Numeral 103 denotes a resistor, and one end thereof is connected to a circuit power supply 104 for supplying a supply voltage ($V_{CC}$), while the other end is connected to the non-inverting input terminal of the comparator 101. Numeral 105 denotes another resistor, and one end thereof is connected to the circuit power supply 104, while the other end is connected to the inverting input terminal of the comparator 101. Numeral 106 denotes still another resistor, and one end thereof is connected to the inverting input terminal, while the other end is connected to ground. Numeral 107 denotes an output block-off circuit, by which output from the gate driver is blocked off or permitted based on an H/L (high/low) signal outputted from the comparator 101.

FIG. 13 is an explanatory graph illustrating input/output waveforms of the comparator 101 when the supply voltage from the circuit power supply 104 in FIG. 12 decreases. In FIG. 13, (a) represents input voltage waveforms inputted into the comparator 101, while (b) represents an output voltage waveform outputted from the comparator 101. Regarding the input voltage waveforms (a), symbol 111A denotes a supply voltage ($V_{CC}$) from the circuit supply voltage 104. Symbol 112A denotes a monitor voltage ($V_{in}$) inputted into the inverting input terminal of the comparator 101. This monitor voltage 112A is to be equal to a voltage obtained by dividing the supply voltage 111A by the resistors 105 and 106. Symbol 113A denotes a reference voltage ($V_{ref}$) inputted into the non-inverting input terminal of the comparator 101. Next, regarding the output voltage waveform (b), symbol 114A denotes an H/L signal outputted from the comparator 101 in response to the input voltage waveforms (a). This H/L signal is to be the L signal as the low voltage or the H signal as the high voltage that is outputted corresponding to comparison results between the reference voltage inputted into the non-inverting input terminal and the monitor voltage inputted into the inverting input terminal.

By referring to the input/output waveforms, represented in FIG. 13, of the comparator 101, an operation, when the supply voltage 111A of the circuit power supply 104 decreases, is explained. When the supply voltage 111A decreases, the monitor voltage 112A also decreases accordingly. During the monitor voltage 112A inputted into the comparator 101 being higher than the reference voltage 113A, the L signal is outputted as the H/L signal 114A from the comparator 101. The output block circuit 107 permits output from the gate driver during the L signal being inputted (represented as an output enable region 115A in FIG. 13). When the monitor voltage 112A further decreases to reach the reference voltage 113A, the output from the comparator 101 is inverted; consequently, the H signal is outputted as the H/L signal 114A. The output block circuit 107 blocks output from the gate driver during the H signal being inputted (represented as an output block region 116A).

FIG. 14 is an explanatory graph illustrating input/output waveforms of the comparator 101, when the supply voltage from the circuit power supply 104 gradually increases, for example, at power on. In FIG. 14, the same symbols are given to components that are the same as or equivalent to those represented in FIG. 13. In FIG. 14, (a) represents input voltage waveforms inputted into the comparator 101, while (b) represents an output voltage waveform outputted from the comparator 101. Regarding the input voltage waveforms (a), symbol 111B denotes a supply voltage ($V_{CC}$) of the circuit power supply 104. Symbol 112B denotes a monitor voltage ($V_{in}$) inputted into the inverting input terminal of the comparator 101. Symbol 113B denotes a reference voltage ($V_{ref}$) inputted into the non-inverting input terminal of the comparator 101. Next, regarding the output voltage waveform (b), symbol 114B denotes an H/L signal outputted from the comparator 101 in response to the input voltage waveforms (a). This H/L signal is to be the L signal as the low voltage or the H signal as the high voltage that are outputted corresponding to comparison results between the reference voltage inputted into the non-inverting input terminal and the monitor voltage inputted into the inverting input terminal.

By referring to the input/output waveforms, represented in FIG. 14, of the comparator 101, an operation when the supply voltage 111B of the circuit power supply 104 gradually increases is explained. When the supply voltage 111B gradually increases, the monitor voltage 112B also increases with a voltage obtained by dividing the supply voltage 111B by the resistors 105 and 106. During the monitor voltage 112B inputted into the comparator 101 being lower than the reference voltage 113B, the H signal is outputted as the HL signal 114B from the comparator 101. The output block circuit 107 blocks output from the gate driver during the H signal being inputted (represented as an output block region 116B in FIG. 14). The monitor voltage 112B further increases, and when the value reaches the reference voltage 113B, the output from the comparator 101 is inverted; consequently, the L signal is outputted as the H/L signal 114B. The output block circuit 107 permits output from the gate driver during the L signal being inputted (represented as an output enable region 115B in FIG. 14).

In the conventional undervoltage lockout circuit, the output block and the output permission from the gate driver are performed according to the above operation.

However, for example, at power on, a case may occur in which the supply voltage steeply increases at a rate of several-ten V/μsec, for example, approximately 50 V/μsec. In such a case where the supply voltage steeply increases, the following problems may occur in the above conventional undervoltage lockout circuit.

FIG. 15 is an explanatory graph illustrating input/output waveforms of the comparator 101, when the supply voltage from the circuit power supply 104 steeply increases. In FIG. 15, the same symbols are given to components that are the same as or equivalent to those represented in FIG. 13 and FIG. 14. In FIG. 15, (a) represents input voltage waveforms inputted into the comparator 101, while (b) represents an output voltage waveform outputted from the comparator 101.

Regarding the input voltage waveforms (a), symbol 111C denotes a supply voltage ($V_{CC}$) of the circuit power supply 104. Symbol 112C denotes a monitor voltage ($V_{in}$) inputted into the inverting input terminal of the comparator 101. Symbol 113C denotes a reference voltage ($V_{ref}$) inputted into the non-inverting input terminal of the comparator 101. Next, regarding the output voltage waveform (b), symbol 114C denotes an H/L signal outputted from the comparator 101 in response to the input voltage waveforms (a). This H/L signal is to be the L signal as the low voltage (represented as an output enable region 115C in FIG. 15) or the H signal as the high voltage (represented as an output block region 116C) that are outputted corresponding to comparison results between the reference voltage inputted into the non-inverting input terminal and the monitor voltage inputted into the inverting input terminal.

By referring to the input/output waveforms of the comparator 101 illustrated in FIG. 15, an operation when the supply voltage 111C of the circuit power supply 104 steeply increases is explained. In response to the steep increase of the supply voltage 111C, the monitor voltage 112C that is a voltage obtained by dividing the supply voltage 111C by the resistor 105 and the resistor 106 follows this steep increase. However, because a certain time is required for charging the pn-junction capacitance of the Zener diode 102, the reference voltage 113C cannot follow this steep increase. Therefore, during a short period just after the supply voltage 111C has started to increase, specifically within several μsec, a region in which the monitor voltage 112C exceeds the reference voltage 113C is generated (represented as an output-block impossible region 117C in FIG. 15). In this output-unblocked region 117C, as represented in FIG. 14, the H signal is outputted from the comparator 101, and the output block circuit 107 has to block the output from the gate driver; however, because the L signal is actually outputted from the comparator 101, the output block circuit 107 permits the output from the gate driver. Accordingly, a problem occurs in which the output from the gate driver cannot be normally blocked. As a result, the gate driver cannot be normally operated.

SUMMARY OF THE INVENTION

An objective of the present invention, which has been made to solve the above-described problems, is to enable the gate-driver output to be normally blocked and permitted even when the supply voltage steeply increases, and is to provide a highly-reliable undervoltage lockout circuit.

An undervoltage lockout circuit according to the present invention includes a reference-voltage circuit for outputting a reference voltage, a monitor-voltage circuit for outputting a monitor voltage, and a comparator for outputting, the reference voltage and the monitor voltage being inputted, an H/L signal, corresponding to comparison results of the reference voltage and the monitor voltage, in which a monitor-voltage-circuit time constant for determining an increasing rate of the monitor voltage is set higher than a reference-voltage-circuit time constant for determining an increasing rate of the reference voltage.

According to the present invention, because the monitor-voltage-circuit time constant for determining the increasing rate of the monitor voltage is set higher than the reference-voltage-circuit time constant for determining the increasing rate of the reference voltage, during a period until the monitor voltage reaches the reference voltage, the monitor voltage necessarily becomes lower than the reference voltage. Therefore, even when the supply voltage steeply increases, the block and the permission of the gate-driver output are normally enabled. Accordingly, a highly-reliable undervoltage lockout circuit can be obtained.

DETAILED DESCRIPTION OF THE PREFERRED EMBODIMENTS

Embodiment 1

Figure 1:
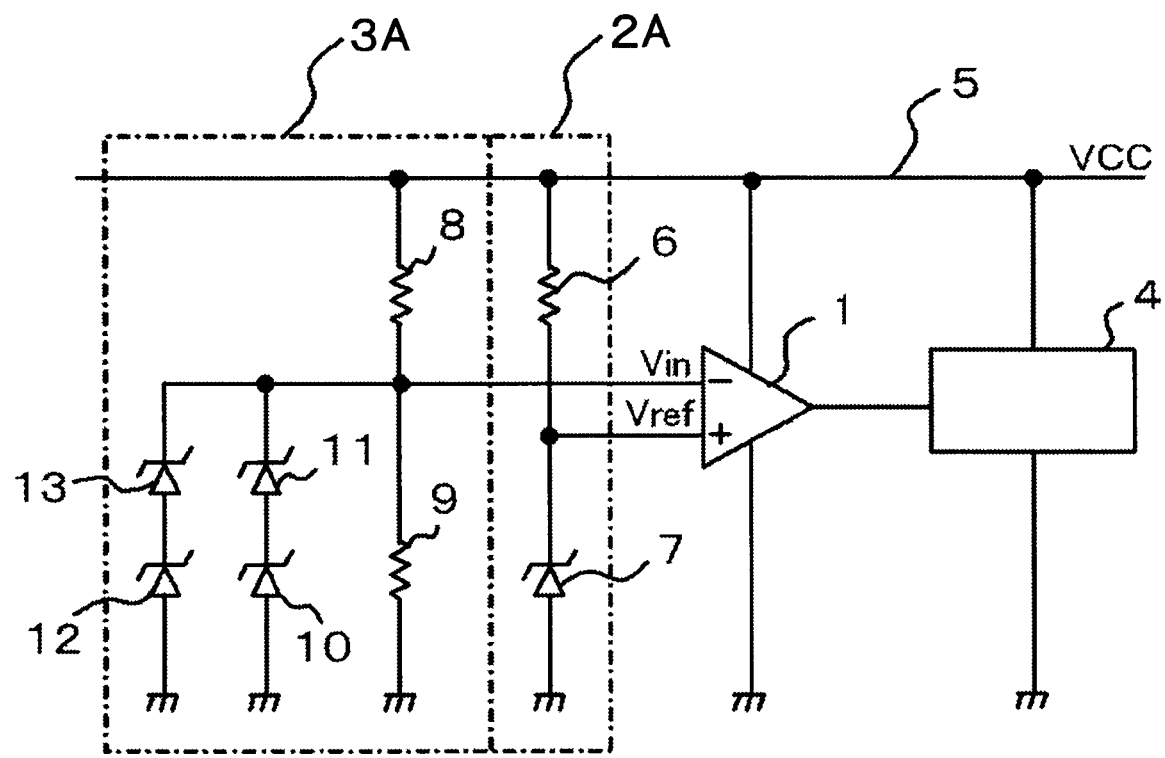
FIG. 1 is a circuit diagram illustrating an undervoltage lockout circuit according to Embodiment 1 of the present invention.

Embodiment 1 according to the present invention is explained. FIG. 1 is a circuit diagram illustrating an undervoltage lockout circuit according to Embodiment 1 of the present invention. In FIG. 1, a reference voltage ($V_{ref}$) outputted from a reference-voltage circuit 2A is inputted into the non-inverting input terminal of a comparator 1. Meanwhile, a monitor voltage ($V_{in}$) outputted from a monitor-voltage circuit 3A is inputted into the inverting input terminal of the comparator 1. Thus, based on comparison results of the monitor voltage in response to the reference voltage, the L signal as the low voltage or the H signal as the high voltage is outputted from the comparator 1 to an output block circuit 4. The output block circuit 4 blocks or permits output of a gate driver, based on the H/L (high/low) signal.

The reference-voltage circuit 2A is configured with a first resistor 6 one end of which is connected to a circuit power supply 5 that supplies a supply voltage ($V_{CC}$), and the other end of which is connected to the non-inverting input terminal of the comparator 1, and of a first Zener diode 7 whose anode is grounded, and whose cathode is connected to the non-inverting input terminal of the comparator 1.

The monitor-voltage circuit 3A is configured with a second resistor 8 one end of which is connected to the circuit power supply 5, and the other end of which is connected to the inverting input terminal of the comparator 1, a third resistor 9 one end of which is grounded, and the other end of which is connected to the inverting input terminal of the comparator 1, and combinations of a second and a third Zener diodes 10 and 11, and a fourth and a fifth Zener diodes 12 and 13, in which each of the combinations is arranged in parallel to the third resistor 9 and is in series with its cathode being connected to the inverting input terminal, while its anode being grounded.

In such undervoltage lockout circuit, the combined resistance value determined by the second resistor 8 and the third resistor 9 that constitute the monitor-voltage circuit 3A is set higher than the value of the first resistor 6 that constitutes the reference-voltage circuit 2A. More simply, each value of the second resistor 8 and the third resistor 9 may be set higher than the value of the first resistor 6. Regarding the second to the fifth Zener diodes 10, 11, 12, and 13 that constitute the monitor-voltage circuit 3A, a Zener breakdown voltage determined by the combination of the second and the third Zener diodes 10 and 11, and the combination of the fourth and the fifth Zener diodes 12 and 13, each connected in series, is set higher than the monitor voltage.

Figure 2:
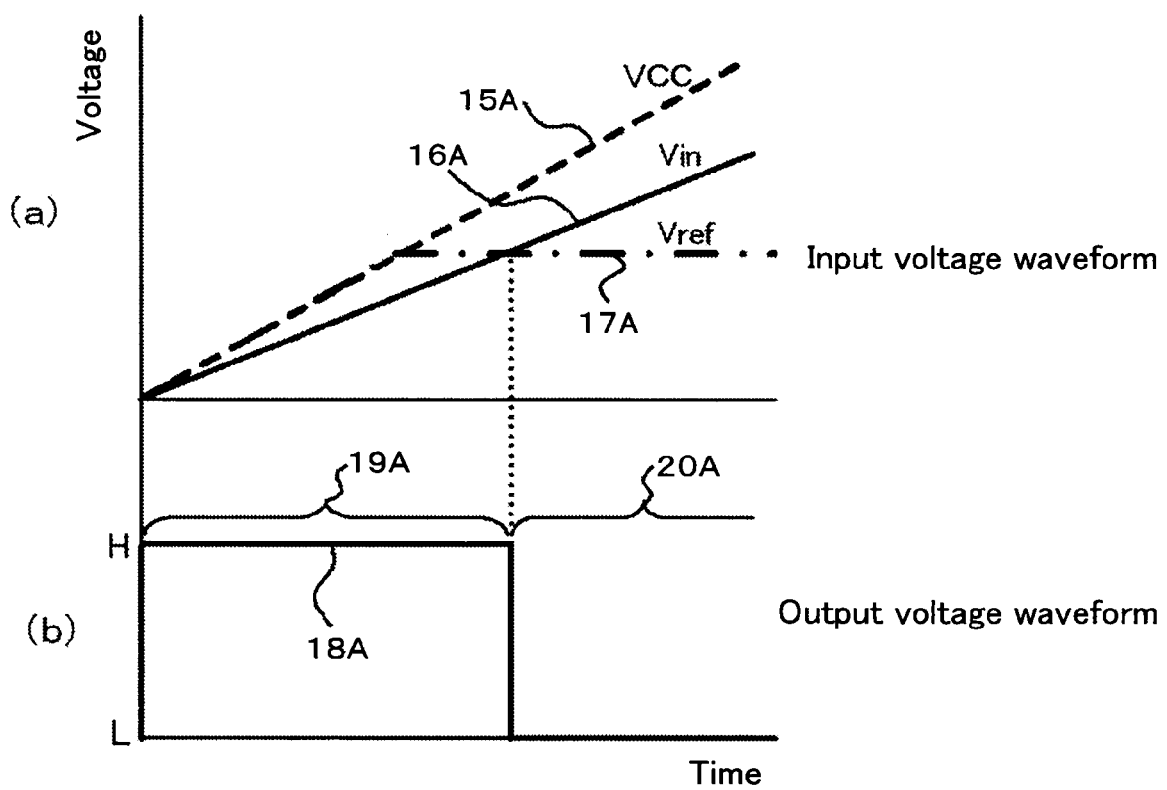
FIG. 2 is an explanatory graph illustrating input/output waveforms of a comparator, when the supply voltage of a circuit power supply provided in the undervoltage lockout circuit according to Embodiment 1 of the present invention gradually increases.

FIG. 2 is an explanatory graph illustrating input/output waveforms of the comparator 1, when the supply voltage from the circuit power supply 5 gradually increases, for example, at a time when power is thrown in. In FIG. 2, (a) represents input voltage waveforms inputted into the comparator 1, while (b) represents an output voltage waveform outputted from the comparator 1. Regarding the input voltage waveforms (a), symbol 15A denotes a supply voltage ($V_{CC}$) of the circuit power supply 5. Symbol 16A denotes a monitor voltage ($V_{in}$) inputted from the monitor-voltage circuit 3A into the inverting input terminal of the comparator 1. Symbol 17A denotes a reference voltage ($V_{ref}$) inputted from the reference-voltage circuit 2A into the non-inverting input terminal of the comparator 1. Next, regarding the output voltage waveform (b), symbol 18A denotes an H/L signal outputted from the comparator 1 in response to the input voltage waveforms (a). This H/L signal becomes the L signal as the low voltage or the H signal as the high voltage that is outputted corresponding to comparison results between the reference voltage inputted into the non-inverting input terminal and the monitor voltage inputted into the inverting input terminal.

By referring to the input/output waveforms of the comparator 1 illustrated in FIG. 2, an operation when the supply voltage 15A gradually increases is explained. In the following explanation, in order to easily understand the present invention, the description is given using provisional values. Specifically, the description is given with the supply voltage from the circuit power supply 5 being set at 15V, the Zener breakdown voltage of the first to fifth Zener diodes 7, 10, 11, 12, and 13 being set at 6V, the values of the second and third resistor 8 and 9 being set equal to each other, and their combined resistance value being set higher than that of the first resistor 6.

When the supply voltage 15A gradually increases, the monitor voltage 16A also increases with a voltage value divided by the second and third resistors 8 and 9. Due to the current flowing across the first resistor 6 from the supply voltage 15A, the reference voltage 17A also increases with the supply voltage 15A. Then, when the reference voltage 17A reaches the Zener breakdown voltage 6 V of the first Zener diode 7, the reference voltage 17A becomes constant at the voltage of 6 V. Because the monitor voltage 16A is a voltage divided by the second and the third resistors 8 and 9, if the resistances of the second and the third resistors 8 and 9 are equal to each other, after having increased up to 7.5 V that is half of the supply voltage 15A, the monitor voltage 16A becomes constant. Moreover, because the Zener breakdown voltage of the Zener diodes connected in series to each other is the sum of Zener breakdown voltages of the Zener diodes, assuming that the Zener breakdown voltage of the second to the fifth Zener diodes 10, 11, 12, and 13 is equal to that of the first Zener diode 7, the Zener breakdown voltages of the second and the third Zener diodes 10 and 11, and the fourth and the fifth Zener diodes 12 and 13, each connected in series, are calculated to be 12 V. Because the Zener breakdown voltage of 12 V is higher than the maximum value 7.5 V of the monitor voltage 16A, in the second and the third Zener diodes 10 and 11, and the fourth and the fifth Zener diodes 12 and 13, each connected in series, the Zener breakdown never occurs.

In such undervoltage lockout circuit, during the monitor voltage 16A inputted into the comparator 1 being lower than the reference voltage 17A, the H signal is outputted as the H/L signal 18A from the comparator 1. The output block circuit 4 blocks output from the gate driver during the H signal being inputted (represented as an output block region 19A in FIG. 2). Moreover, the monitor voltage 16A increases and reaches the reference voltage 17A; then, the output from the comparator 1 is inverted, and the L signal is outputted as the H/L signal 18A. The reference voltage 17A during this operation is 6V, which equals to the Zener breakdown voltage of the first Zener diode 7. The output block circuit 4 permits the output from the gate driver during the L signal being inputted (represented as an output enable region 20A in FIG. 2). Here, the monitor voltage 16A becomes constant after having increased up to 7.5 V that is half of the voltage 15 V of the supply voltage 15A.

Figure 14:
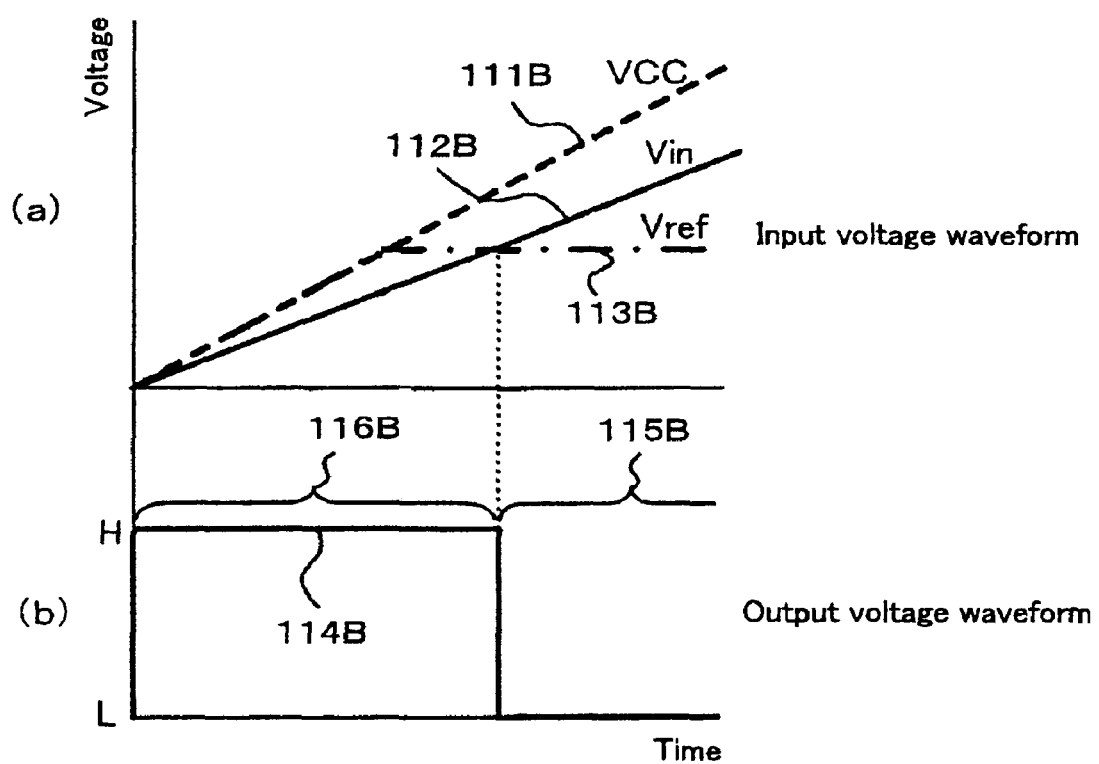
FIG. 14 is an explanatory graph illustrating input/output waveforms of the comparator, when the supply voltage from the circuit power supply provided in the conventional undervoltage lockout circuit gradually increases.

When the supply voltage 15A gradually increases as described above, the operation is equivalent to that of the conventional undervoltage lockout circuit represented in FIG. 14.

Figure 3:
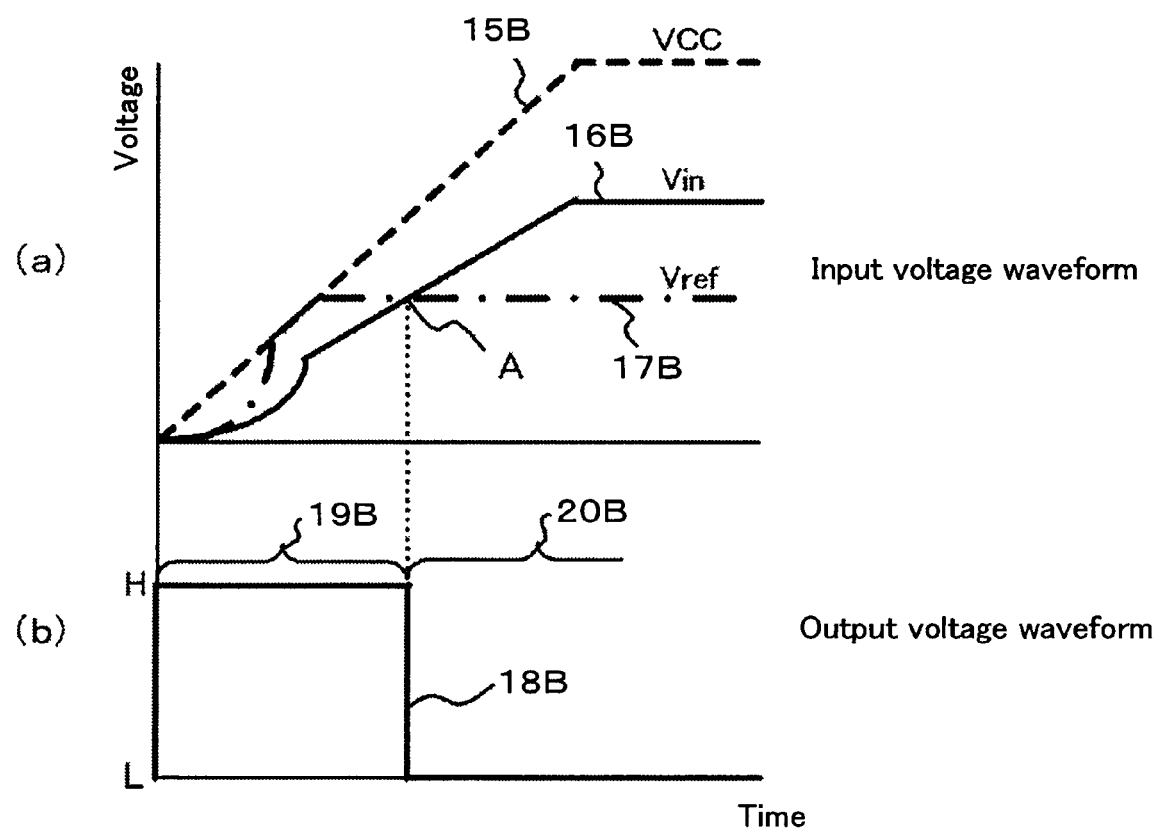
FIG. 3 is an explanatory graph illustrating input/output waveforms of the comparator, when the supply voltage from the circuit power supply provided in the undervoltage lockout circuit according to Embodiment 1 of the present invention steeply increases.

FIG. 3 is an explanatory graph illustrating input/output waveforms of the comparator 1, when a supply voltage 15B of the circuit power supply 5 steeply increases. In FIG. 3, (a) represents input voltage waveforms inputted into the comparator 1, and (b) represents an output voltage waveform outputted from the comparator 1. Symbol 15B of the input voltage waveforms in (a) denotes the supply voltage ($V_{CC}$) of the circuit power supply 5. Symbol 16B denotes a monitor voltage ($V_{in}$) inputted into the inverting input terminal of the comparator 1. Symbol 17B denotes a reference voltage ($V_{ref}$) inputted into the non-inverting input terminal of the comparator 1. While, symbol 18B of the output voltage waveform in (b) denotes an H/L signal, in response to the input voltage wave forms in (a), outputted from the comparator 1. This H/L signal is outputted corresponding to comparison results of the reference voltage inputted into the non-inverting input terminal and the monitor voltage inputted into the inverting input terminal, that is, the L signal as the low voltage, or the H signal as the high voltage is outputted.

Referring to the input/output waveforms of the comparator 1, which are represented in FIG. 3, an operation when the supply voltage 15B of the circuit power supply 5 steeply increases is explained. When the supply voltage 15B steeply increases at a rate of several-ten V/μsec, for example, approximately at 50 V/μsec, because a certain time is required for charging the pn-junction capacitance of the first Zener diode 7, in a short time (within several μsec) just after the supply voltage 15B has started to increase, the reference voltage 17B cannot follow the steep increase. The potential increasing rate at this time is determined by a time constant ($\tau_{Vref1} = R_1 \times C_{z1}$) that is a product of the pn-junction capacitance ($C_{z1}$) of the first Zener diode 7 and the resistance ($R_1$) of the first resistor 6 for determining the charge current of the first Zener diode 7. Then, when the supply voltage 15B increases to approximately 3-4 V, because the pn-junction capacitance of the first Zener diode 7 is charged up, the reference voltage 17B follows the increase of the supply voltage 15B, and becomes constant at the Zener breakdown voltage of the first Zener diode 7. Here, assuming that the Zener breakdown voltage of the first Zener diode 7 is 6 V, the reference voltage 17B reaches a constant value of 6 V.

Moreover, because a certain time is required for charging the pn-junction capacitance of the second to the fifth Zener diodes 10, 11, 12, and 13 in a short time (within several μsec) just after the supply voltage 15B has started to increase, the monitor voltage 16B cannot follow the steep increase either. The potential increasing rate at this time is determined by a time constant ($\tau_{Vref2} = R_2 \times C_{z2}$) that is a product of the pn-junction capacitance ($C_{z2}$) of the second to the fifth Zener diodes 10, 11, 12, and 13 and the combined resistance ($R_2$; here, $R_2 > R_1$) of the second resistor 8 and the third resistor 9 for determining the charge current of the second to the fifth Zener diodes 10, 11, 12, and 13. Because the combined resistance ($R_2$) of the second resistor 8 and the third resistor 9 is set higher than the resistance ($R_1$) of the first resistor 6, the time constant ($\tau_{Vref2}$) of the monitor-voltage circuit 3A becomes larger than the time constant ($\tau_{Vref1}$) of the reference-voltage circuit 2A ($\tau_{Vref2} > \tau_{Vref1}$). Therefore, the potential increase of the monitor-voltage circuit 3A becomes slower than that of the reference-voltage circuit 2A. Accordingly, also just after the supply voltage 15B has started to increase, the monitor voltage 16B never exceeds the reference voltage 17B. Then, when the supply voltage 15B increases to approximately 3-4 V, because the pn-junction capacitance of the second to the fifth Zener diodes 10, 11, 12, and 13 is charged up, the monitor voltage 16B increases with a voltage obtained by dividing the supply voltage 15B by the second resistor 8 and the third resistor 9, and then, becomes constant. If the values of the second resistor 8 and the third resistor 9 are equal to each other, the monitor voltage 16B increases up to 7.5 V that is the half value of the supply voltage 15B, and then, becomes constant.

Figure 15:
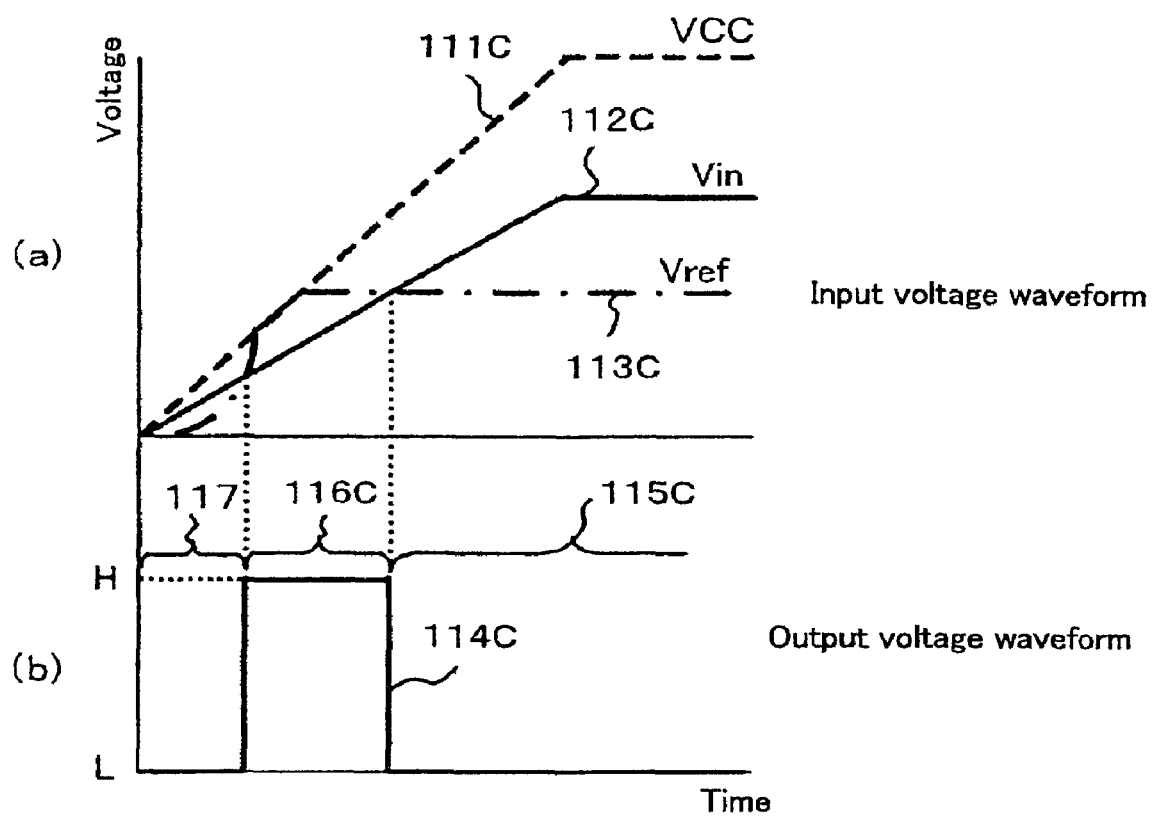
FIG. 15 is an explanatory view illustrating input/output waveforms of the comparator, when the supply voltage from the circuit power supply provided in the conventional undervoltage lockout circuit steeply increases.

As described above, because the monitor-voltage circuit 3A and the reference-voltage circuit 2A are configured in such a way that the increasing-rate time constant of the monitor voltage 16B ($\tau_{Vref2} = R_2 \times C_{z2}$) is set larger than that of the reference voltage 17B ($\tau_{Vref1} = R_1 \times C_{z1}$), the output-unblocked region 117, as represented in FIG. 15, appealing in a short time just after the supply voltage 15B has started to increase disappears. Accordingly, during a period represented as "A" in FIG. 3, just after the supply voltage 15B has started to increase, until the monitor voltage 16B, reaches the reference voltage 17B, because the monitor voltage 16B becomes consistently lower than the reference voltage 17B, the H signal is outputted as the H/L signal from the comparator 1. The output block circuit 4 blocks output from the gate driver during the H signal being inputted (represented as an output block region 19B in FIG. 3). After the monitor voltage 16B has reached the reference voltage 17B, because the monitor voltage 16B exceeds the reference voltage 17B, the L signal is outputted as the H/L signal 18B from the comparator 1. The output block circuit 4 permits output from the gate driver during the L signal being inputted (represented as an output enable region 20B in FIG. 3). Accordingly, even when the supply voltage 15B of the circuit power supply 5 steeply increases, block and permission of the gate-driver output can be stably performed.

According to Embodiment 1, because the undervoltage lockout circuit has been configured in such a way that the time constant of the monitor-voltage circuit 3A ($\tau_{Vref2}$), which determines the increasing rate of the monitor voltage 16B, is larger than that of the reference-voltage circuit 2A ($\tau_{Vref1}$), which determines the increasing rate of the reference voltage 17B, even when the supply voltage 15B of the circuit power supply 5 steeply increases, the output unblocked region 117 having appeared just after the supply voltage 15B has started to increase can be removed. Therefore, normal and stable block and permission of the gate-driver output can be realized. Accordingly, a reliable undervoltage lockout circuit can be obtained.

Figure 4:
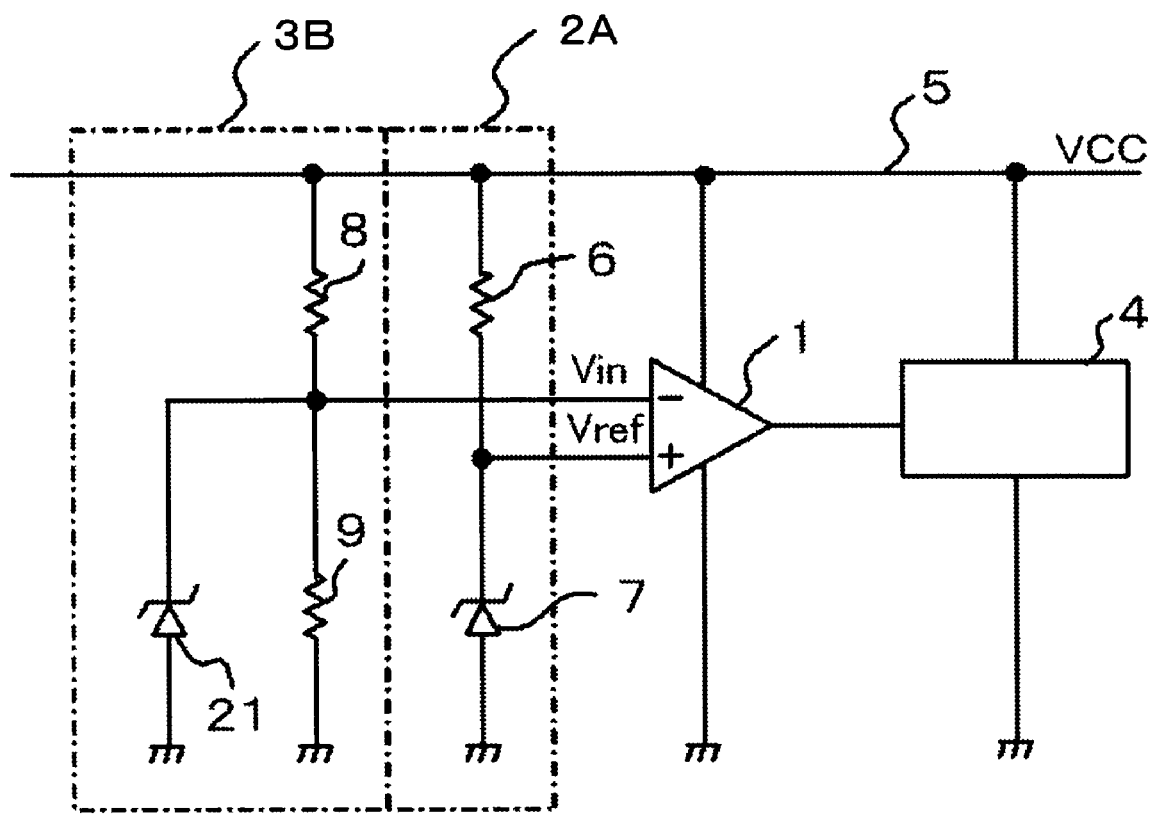
FIG. 4 is a circuit diagram illustrating another example of an undervoltage lockout circuit according to Embodiment 1 of the present invention.

Here, in Embodiment 1, the device has been represented, in which, in parallel to the third resistor, the second and the third Zener diodes 10 and 11 are connected in series to each other, the fourth and the fifth Zener diodes 12 and 13 are connected in series to each other, and each cathode of the third and the fifth Zener diodes 11 and 13 is connected to the inverting input terminal, while each anode of the second and the fourth diodes 10 and 12 is grounded; however, because an objective of this embodiment is to use any Zener diode whose Zener breakdown voltage is equivalent to that of the first Zener diode 7, the type of the Zener diodes and their combinations are not especially limited. For example, as illustrated in FIG. 4, a monitor-voltage circuit 3B may be configured using only a sixth Zener diode 21 whose Zener breakdown voltage is higher than the monitor voltage ($V_{in}$). Here, in FIG. 4, the same symbols are given to members that are the same as or equivalent to those represented in FIG. 1.

Moreover, in Embodiment 1, for explanatory convenience, explanation has been performed using appropriate values; however, it is needless to say that the present invention is not especially limited to these values. These resistors and Zener diodes can be suitably selected so that the condition is satisfied in which the time constant of the monitor-voltage circuit 3A determining the increasing rate of the monitor voltage 16B becomes larger than that of the reference-voltage circuit 2A determining the increasing rate of the reference voltage 17B.

Embodiment 2

Figure 5:
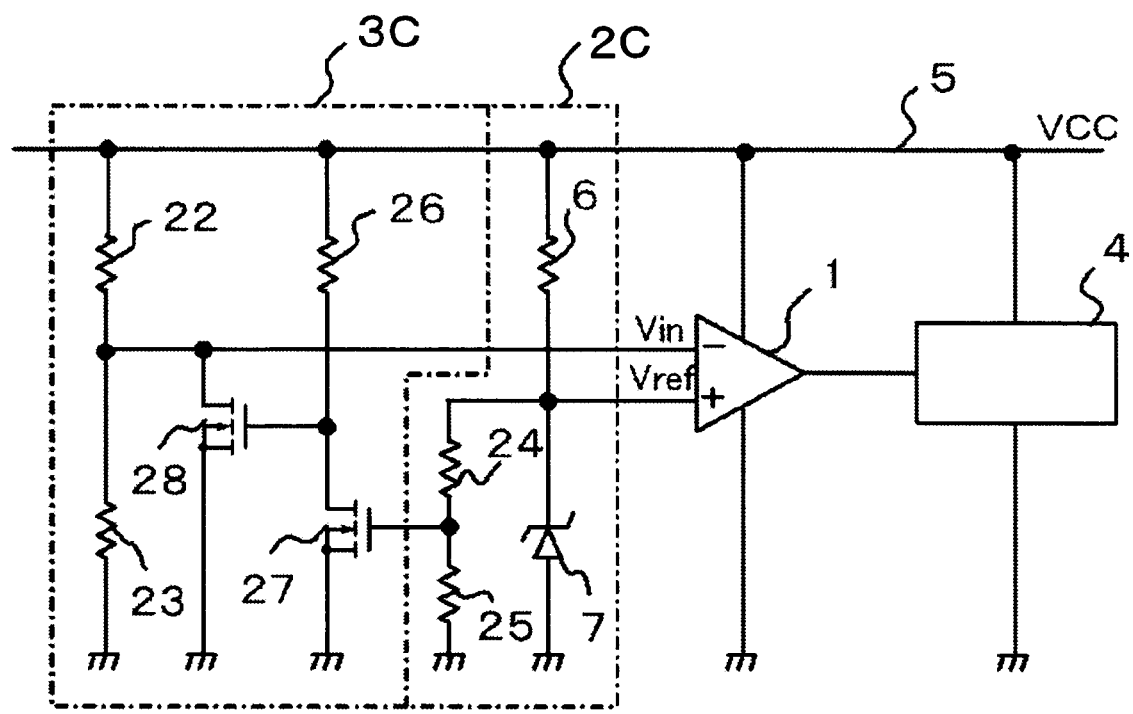
FIG. 5 is a circuit diagram illustrating an undervoltage lockout circuit according to Embodiment 2 of the present invention.

Embodiment 2 according to the present invention is explained. FIG. 5 is a circuit diagram illustrating an undervoltage lockout circuit according to Embodiment 2 of the present invention. In FIG. 5, the same symbols are given to members that are the same as or equivalent to those represented in FIG. 1. In FIG. 5, a reference voltage ($V_{ref}$) outputted from a reference-voltage circuit 2C is inputted into the non-inverting input terminal of the comparator 1. While, a monitor voltage ($V_{in}$) outputted from a monitor-voltage circuit 3C is inputted into the inverting input terminal of the comparator 1. Thus, based on comparison results of the monitor voltage in response to the reference voltage, the L signal as the low voltage or the H signal as the high voltage is outputted from the comparator 1 to an output block circuit 4. The output block circuit 4 blocks or permits output of a gate driver based on the H/L signal.

The reference-voltage circuit 2C is configured with the first resistor 6 one end of which is connected to the circuit power supply 5 that supplies the supply voltage ($V_{CC}$), and the other end of which is connected to the non-inverting input terminal of the comparator 1; and of the first Zener diode 7 whose anode is grounded, and whose cathode is connected to the non-inverting input terminal of the comparator 1, and of a sixth resistor 24 and a seventh resistor 25 connected in series to each other between the non-inverting input terminal of the comparator 1 and the ground.

The monitor-voltage circuit 3C is configured with a fourth resistor 22 one end of which is connected to the circuit power supply 5, and the other end of which is connected to the inverting input terminal of the comparator 1; a fifth resistor 23 one end of which is grounded, and the other end of which is connected to the inverting input terminal of the comparator 1; an eighth resistor 26 one end of which is connected to the circuit power supply 5; a first N-MOS transistor 27, as a first switching device, whose drain terminal is connected to the other end of the eighth resistor 26, whose gate terminal is connected between the sixth resistor 24 and the seventh resistor 25, and whose source terminal is grounded; and a second N-MOS transistor 28, as a second switching device, whose drain terminal is connected to the inverting input terminal of the comparator 1, whose gate terminal is connected to the drain terminal of the first N-MOS transistor 27, and whose source terminal is grounded.

In such an undervoltage lockout circuit, the first N-MOS transistor 27 and the second N-MOS transistor 28 constituting the monitor-voltage circuit 3C are set so that, due to a voltage obtained by dividing the supply voltage by the sixth resistor 24 and the seventh resistor 25 when the supply voltage increases, until the reference voltage reaches the Zener breakdown voltage of the first Zener diode 7, the first N-MOS transistor 27 is in the off state, and the second N-MOS transistor 28 is in the on state, and after having reached the Zener breakdown voltage of the first Zener diode 7, the first N-MOS transistor 27 is in the on state, and the second N-MOS transistor 28 is in the off state.

Figure 6:
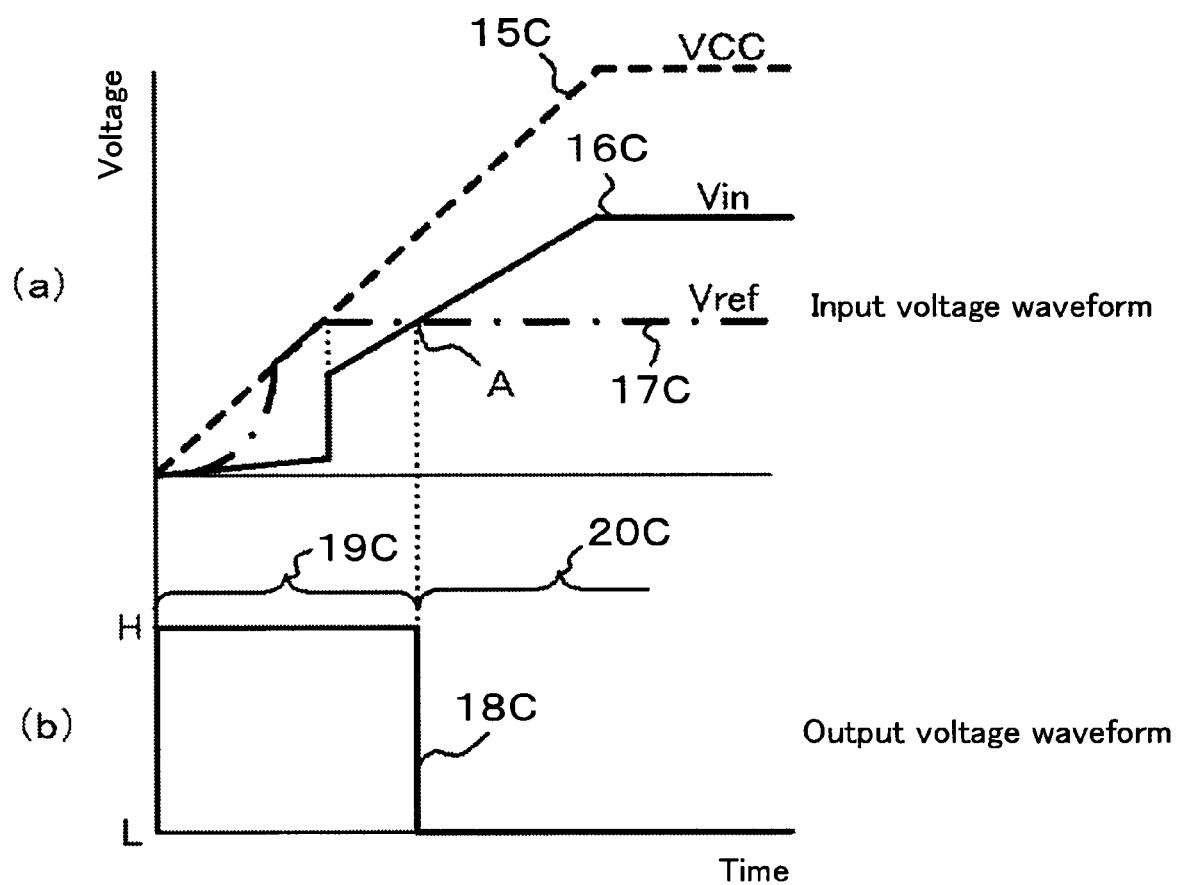
FIG. 6 is an explanatory graph illustrating input/output waveforms of the comparator, when the supply voltage from the circuit power supply provided in the undervoltage lockout circuit according to Embodiment 2 of the present invention steeply increases.

FIG. 6 is an explanatory graph illustrating input/output waveforms of the comparator 1, when the supply voltage from the circuit power supply 5 steeply increases. In FIG. 6, the same symbols are given to members that are the same as or equivalent to those represented in FIG. 3. In FIG. 6, (a) represents input voltage waveforms inputted into the comparator 1, while (b) represents an output voltage waveform outputted from the comparator 1. Regarding the input voltage waveforms (a), symbol 15C denotes a supply voltage ($V_{CC}$) of the circuit supply voltage 5. Symbol 16C denotes a monitor voltage ($V_{in}$) inputted into the inverting input terminal of the comparator 1. Symbol 17C denotes a reference voltage ($V_{ref}$) inputted into the non-inverting input terminal of the comparator 1. Next, regarding the output voltage waveform (b), symbol 18C denotes an H/L signal outputted from the comparator 1 in response to the input voltage waveforms (a). This H/L signal is the L signal as the low voltage or the H signal as the high voltage that are outputted corresponding to comparison results between the reference voltage inputted into the non-inverting input terminal and the monitor voltage inputted into the inverting input terminal.

By referring to the input/output waveforms of the comparator 1 illustrated in FIG. 6, an operation when the supply voltage 15C of the circuit power supply 5 steeply increases is explained. After power on, if the supply voltage 15C steeply increases at a rate of approximately several-ten V/µsec, specifically, approximately at 50 V/µsec, because a certain time is required for charging the pn-junction capacitance of the first Zener diode 7, in a short time (within several µsec) just after the supply voltage 15C has started to increase, the reference voltage 17C cannot follow the steep increase. The potential increasing rate at this time is determined by a time constant based on the first, sixth, and seventh resistors 6, 24, and 25, respectively, and the pn-junction capacitance of the first Zener diode 7. Then, when the supply voltage 15C increases to approximately 3-4 V, because the pn-junction capacitance of the first Zener diode 7 is charged up, the reference voltage 17C follows the increase of the supply voltage 15C, and becomes constant at the Zener breakdown voltage of the first Zener diode 7. For example, as represented in Embodiment 1, assuming that the Zener breakdown voltage of the first Zener diode 7 is 6 V, the reference voltage 17C becomes constant after having increased to 6 V that is the Zener breakdown voltage t.

During a period just after the supply voltage 15C has started to increase until the reference voltage reaches the Zener breakdown voltage of the first Zener diode 7, the first N-MOS transistor 27 is in the off state, and the second N-MOS transistor 28 is switched to the on state due to the potential of the gate terminal being boosted up to the level of the supply voltage 15C through the eighth resistor 26; therefore, the monitor voltage 16C is approximately ground potential (0 V). Therefore, the monitor voltage 16C can never exceed the reference voltage 17C. Then, after the supply voltage 15C has started to increase and the reference voltage 17C has reached the Zener breakdown voltage of the first Zener diode 7, the first N-MOS transistor 27 is switched to the on state, and the second N-MOS transistor 28 is switched to the off state due to the gate-terminal potential falling to approximately ground potential (0 V); therefore, the monitor voltage 16C increases with a voltage obtained by dividing the supply voltage 15C by the fourth resistor 22 and the fifth resistor 23. For example, as represented in Embodiment 1, when the value of the fourth resistor 22 is set to the same as that of the fifth resistor 23, and the supply voltage 15C is set to 15 V in a steady state, the monitor voltage 16C increases to 7.5 V that is half of the supply voltage 15C, and then, becomes constant.

As described above, during the period just after the supply voltage 15C has started to increase until the reference voltage reaches the Zener breakdown voltage of the first Zener diode 7, by switching the first N-MOS transistor 27 to the off state, and the second N-MOS transistor 28 to the on state, the output-unblocked region 117, as represented in FIG. 15, which appears in a short time just after the supply voltage 15C has started to increase is removed. Accordingly, during the period just after the supply voltage 15C has started to increase until the monitor voltage 16C reaches the reference voltage 17C, represented as "A" in FIG. 6, because the monitor voltage 16C becomes consistently lower than the reference voltage 17C, the H signal is outputted as an H/L signal 18C from the comparator 1. The output block circuit 4, during the H signal being inputted, blocks output from the gate driver (represented as an output block region 19C in FIG. 6). After the monitor voltage 16C has reached the reference voltage 17C, because the monitor voltage 16C exceeds the reference voltage 17C, the L signal is outputted as the H/L signal 18C from the comparator 1. The output block circuit 4, during the L signal being inputted, permits the output from the gate driver (represented as an output enable region 20C in FIG. 6). Accordingly, even when the supply voltage from the circuit power supply 5 increases steeply, the output from the gate driver can be stably blocked and permitted.

Here, in the above explanation, a case has been explained in which the supply voltage from the circuit power supply 5 steeply increases; however, even when the supply voltage from the circuit power supply 5 gradually increases, because the reference voltage 17C follows the increase of the supply voltage 15C without any delay as represented in FIG. 2, the monitor voltage 16C can never exceed the reference voltage 17C; therefore, the output from the gate driver can be stably blocked and permitted.

According to Embodiment 2, the undervoltage lockout circuit is configured in such a way that, during the period just after the supply voltage 15C has started to increase until the reference voltage reaches the Zener breakdown voltage of the first Zener diode 7, the first N-MOS transistor 27 is switched to the off state, and the second N-MOS transistor 28 is switched to the on state, and that, after the reference voltage has reached the Zener breakdown voltage of the first Zener diode 7, the first N-MOS transistor 27 is switched to the on state, and the second N-MOS transistor 28 is switched to the off state; therefore, even in a case in which the supply voltage from the circuit power supply 5 increases steeply, the output-unblocked region 117 having appeared in the short time just after the supply voltage 15C has started to increase can be removed. Thus, the output from the gate driver can be stably blocked and permitted. Accordingly, a high-reliability undervoltage lockout circuit can be obtained.

Embodiment 3

Figure 7:
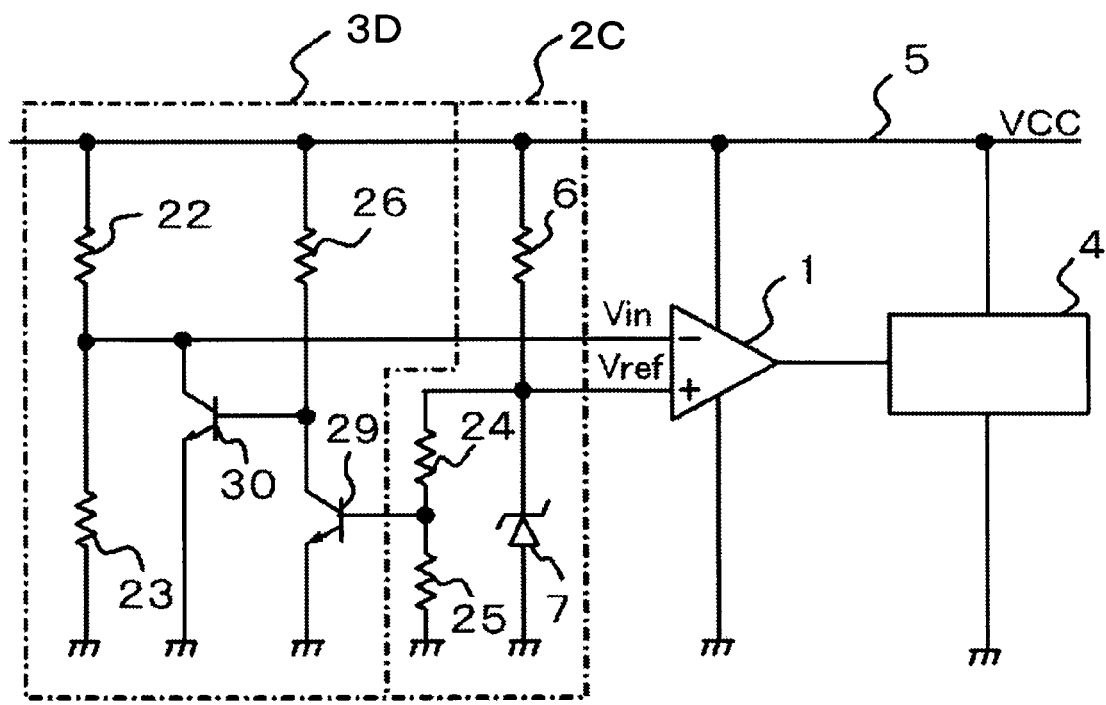
FIG. 7 is a circuit diagram illustrating an undervoltage lockout circuit according to Embodiment 3 of the present invention.

According to Embodiment 2, the configuration of the undervoltage lockout circuit has been represented for removing the output unblocked region 117 that occurs in a short time just after the supply voltage 15C has started to increase, in which, during the period just after the supply voltage 15C has started to increase until the reference voltage reaches the Zener breakdown voltage of the first Zener diode 7, the first N-MOS transistor 27 is made to switch off, and the second N-MOS transistor 28 is made to switch on, and in which, after the reference voltage has reached the Zener breakdown voltage of the first Zener diode 7, the first N-MOS transistor 27 is made to switch on, and the second N-MOS transistor 28 is made to switch off; however, as represented in FIG. 7, a monitor-voltage circuit 3D may be configured using a first NPN transistor 29 instead of the first N-MOS transistor 27, and a second NPN transistor 30 instead of the second N-MOS transistor 28. In this case, in the first NPN transistor 29, the collector terminal is connected to the eighth resistor 26, the base terminal is connected between the sixth and seventh resistors 24 and 25, and the emitter terminal is grounded. While, in the second NPN transistor 30, the collector terminal is connected to the inverting input terminal of the comparator 1, the base terminal is connected to the collector terminal of the first NPN transistor 29, and the emitter terminal is grounded. Other members are the same as or equivalent to those represented in FIG. 5 of Embodiment 2; therefore, the same symbols are given thereto, and the explanation is omitted.

In FIG. 7, the difference in operation from Embodiment 2 during the supply-voltage increase is that, during a period just after the supply voltage 15C has started to increase until the reference voltage reaches the Zener breakdown voltage of the first Zener diode 7, the first NPN transistor 29 is made to switch off, and the second NPN transistor 30 is made to switch on, and that, after the reference voltage has reached the Zener breakdown voltage of the first Zener diode 7, the first NPN transistor 29 is made to switch on, and the second NPN transistor 30 is made to switch off. Other members and operations are the same as those represented in Embodiment 2; therefore, the explanation is omitted here.

According to Embodiment 3, the same effect as that in Embodiment 2 can be obtained.

Embodiment 4

Figure 8:
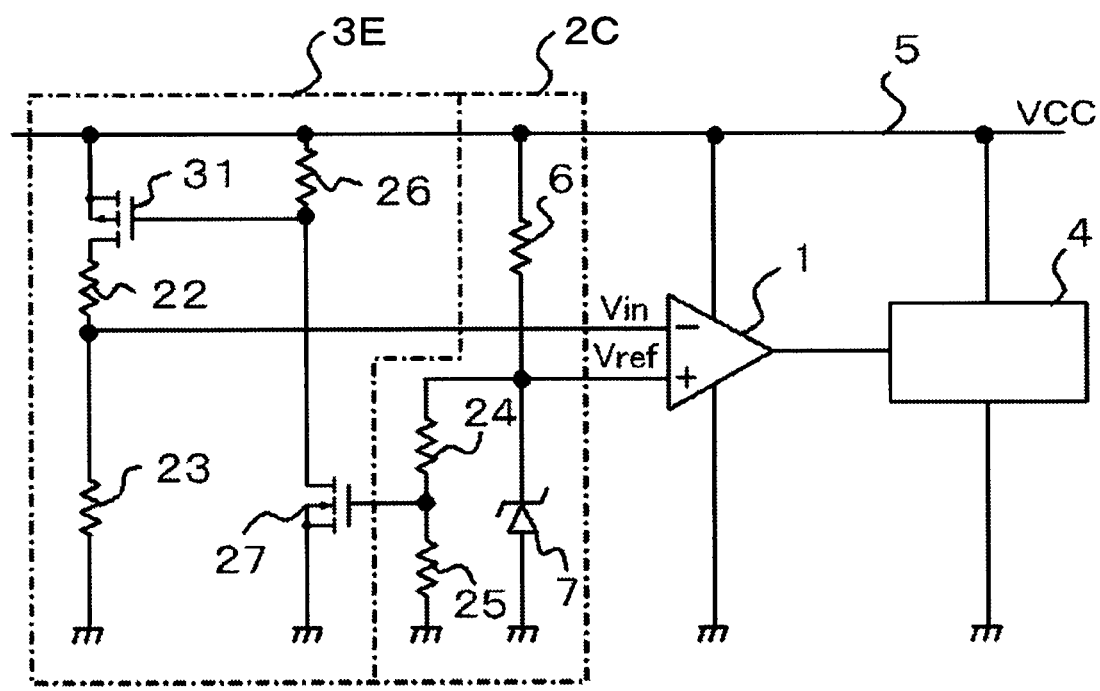
FIG. 8 is a circuit diagram illustrating an undervoltage lockout circuit according to Embodiment 4 of the present invention.

Embodiment 4 according to the present invention is explained. FIG. 8 is a circuit diagram illustrating an undervoltage lockout circuit according to Embodiment 4 of the present invention. In FIG. 8, a circuit configuration different from that in FIG. 5 of Embodiment 2 is that a first P-MOS transistor 31, instead of the second N-MOS transistor 28 in FIG. 5, is used as a third switching device, whose source terminal is connected to the circuit power supply 5 for supplying the supply voltage, whose gate terminal is connected to the drain terminal of the first N-MOS transistor 27, and whose drain terminal is connected to one end of the fourth resistor 22. Other members are the same as or equivalent to those represented in FIG. 5 of Embodiment 2; therefore, the same symbols are given thereto, and the explanation is omitted.

In such an undervoltage lockout circuit, the first N-MOS transistor 27 and the first P-MOS transistor 31 constituting the monitor-voltage circuit 3E are set so that, due to a voltage value divided by the sixth and seventh resistors 24 and 25 when the supply voltage increases, until supply voltage reaches the Zener breakdown voltage of the first Zener diode 7, the first N-MOS transistor 27 is switched to the off state and the first P-MOS transistor 31 is switched to the off state, and that, after having reached the Zener breakdown voltage of the first Zener diode 7, the first N-MOS transistor 27 is switched to the on state and the first P-MOS transistor 31 is switched to the on state.

Figure 9:
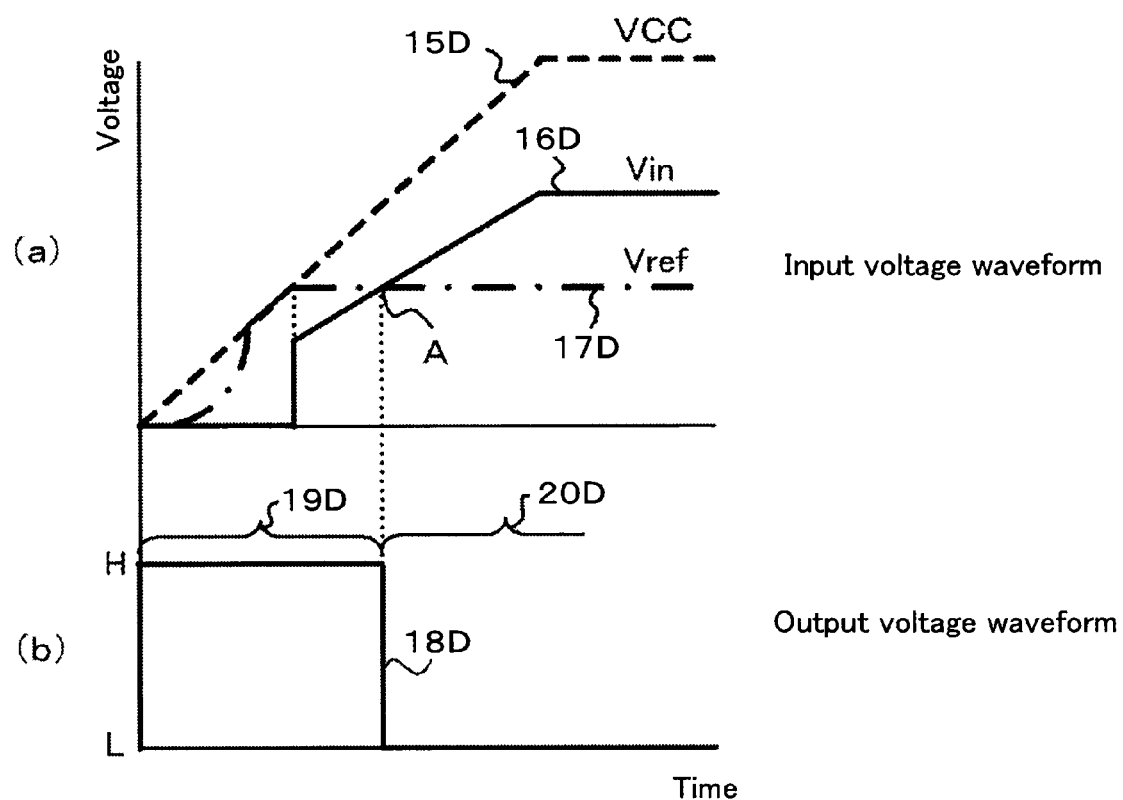
FIG. 9 is an explanatory graph illustrating input/output waveforms of the comparator, when the supply voltage from the circuit power supply provided in the undervoltage lockout circuit according to Embodiment 4 of the present invention steeply increases.

FIG. 9 is an explanatory graph illustrating input/output waveforms of the comparator 1 when the supply voltage from the circuit power supply 5 steeply increases. In FIG. 9, the same symbols are given to members that are the same as or equivalent to those represented in FIG. 6. In FIG. 9, input voltage waveforms inputted into the comparator 1 are represented in (a), and an output voltage waveform outputted from the comparator 1 is represented in (b). Among the input voltage waveforms (a), symbol 15D denotes a supply voltage ($V_{CC}$) of the circuit power supply 5. Symbol 16D denotes a monitor voltage ($V_{in}$) inputted into the inverting input terminal of the comparator 1. Symbol 17D denotes a reference voltage ($V_{ref}$) inputted into the non-inverting input terminal of the comparator 1. Next, in the output voltage waveform (b), symbol 18D denotes an H/L signal outputted from the comparator 1 in response to the input voltage waveforms (a). Regarding this H/L signal, the L signal as a low-voltage state or the H signal as a high-voltage state outputted according to comparison results between the reference voltage inputted into the non-inverting input terminal and the monitor voltage inputted into the inverting input terminal is outputted.

By referring to the input/output waveforms of the comparator 1 represented in FIG. 9, an operation when the supply voltage 15D of the circuit power supply 5 steeply increases is explained. After power has been thrown in, if the supply voltage 15D steeply increases at a rate of approximately several-ten V/μsec, specifically, approximately at 50 V/μsec, because a certain time is required for charging the pn-junction capacitance of the first Zener diode 7, in a short time (within several μsec) just after the supply voltage 15D has started to increase, the reference voltage 17D cannot follow the steep increase. The potential increasing rate at this time is determined by a time constant based on the first resistor 6, the sixth resistor 24, and the seventh resistor 25, and the pn-junction capacitance of the first Zener diode 7. Then, when the supply voltage 15D increases to approximately 3-4 V, because the pn-junction capacitance of the first Zener diode 7 is charged up, the reference voltage 17D follows the increase of the supply voltage 15D, and after having increased up to the Zener breakdown voltage of the first Zener diode 7, the voltage becomes constant. For example, as represented in Embodiment 1, assuming that the Zener breakdown voltage of the first Zener diode 7 is 6 V, after the reference voltage 17D has increased up to 6 V that is the Zener breakdown voltage, the voltage becomes constant.

During a period just after the supply voltage 15D has started to increase until the reference voltage reaches the Zener breakdown voltage of the first Zener diode 7, the first N-MOS transistor 27 is switched to the off state, and the first P-MOS transistor 31 is also switched to the off state due to the potential of the gate terminal being increased up to the level of the supply voltage 15D through the eighth resistor 26; therefore, the monitor voltage 16D becomes the ground level (0 V). Accordingly, the monitor voltage 16D can never exceed the reference voltage 17D. Then, after the reference voltage 17D has reached the Zener breakdown voltage of the first Zener diode 7, the first N-MOS transistor 27 is switched to the on state, and the first P-MOS transistor 31 is also switched to the on state due to the potential of the gate terminal being at the ground level (0 V); therefore, the monitor voltage 16D increases with a voltage obtained by dividing the supply voltage 15D by the fourth and fifth resistors 22 and 23. For example, as represented in Embodiment 1, assuming that the values of the fourth resistor 22 and the fifth resistor 23 are equal to each other, and that the supply voltage 15D is set to be 15 V in a steady state, the monitor voltage 16D increases up to 7.5 V that is half of the supply voltage 15D, and then becomes constant.

As described above, during the period just after the supply voltage 15D has started to increase until the reference voltage reaches the Zener breakdown voltage of the first Zener diode 7, by switching the first N-MOS transistor 27 to the off state, and also the first P-MOS transistor 31 to the off state, the output-unblocked region 117, represented in FIG. 15, that occurs in a short time just after the supply voltage 15D has started to increase is removed. Accordingly, during a period just after the supply voltage 15D has started to increase until the monitor voltage 16D reaches the reference voltage 17D, where this point is indicated by "A" in FIG. 9, because the monitor voltage 16D is always lower than the reference voltage 17D, the H signal is outputted as an H/L signal 18D from the comparator 1. While the H signal is inputted, the output-block circuit 4 blocks output from the gate driver (represented as an output block region 19D in FIG. 9). After the monitor voltage 16D has reached the reference voltage 17D, because the monitor voltage 16D exceeds the reference voltage 17D, the L signal is outputted as the H/L signal 18D from the comparator 1. While the L signal is inputted, the output block circuit 4 permits output from the gate driver (represented as an output enable region 20D in FIG. 9). Accordingly, even when the supply voltage outputted from the circuit power supply 5 steeply increases, block and permission of the gate-driver output can be stably performed.

Here, in the above explanation, a case has been explained in which the supply voltage from the circuit power supply 5 is steeply increased; however, even when the supply voltage from the circuit power supply 5 gradually increases, because the reference voltage 17D follows the increase of the supply voltage 15D without any time delay as represented in FIG. 2, the monitor voltage 16D can never exceed the reference voltage 17D; therefore, the output from the gate driver can also be stably blocked and permitted.

According to this Embodiment 4, the undervoltage lockout circuit has been configured in such a way that, during the period just after the supply voltage 15D has started to increase until the reference voltage reaches the Zener breakdown voltage of the first Zener diode 7, the first N-MOS transistor 27 is switched to the off state, and the first P-MOS transistor 31 is also switched to the off state, and that, after the reference voltage having reached the Zener breakdown voltage of the first Zener diode 7, the first N-MOS transistor 27 is switched to the on state, and the first P-MOS transistor 31 is also switched to the on state; therefore, even if the supply voltage from the circuit power supply 5 steeply increases, the output-unblocked region 117 can be removed that has occurred in the short time just after the supply voltage 15D has started to increase. Therefore, normal output block and output permission of the gate driver can be realized. Accordingly, a highly-reliable undervoltage lockout circuit can be obtained.

Embodiment 5

Figure 10:
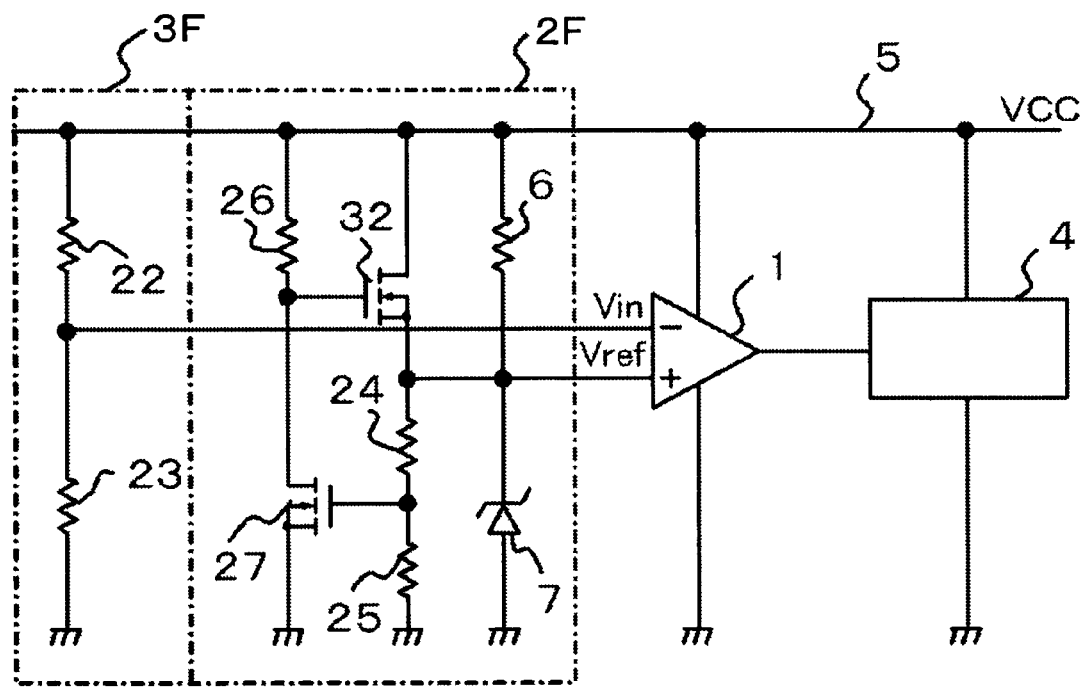
FIG. 10 is a circuit diagram illustrating an undervoltage lockout circuit according to Embodiment 5 of the present invention.

Embodiment 5 according to the present invention is explained. FIG. 10 is a circuit diagram illustrating an undervoltage lockout circuit according to Embodiment 5 of the present invention. In FIG. 10, a circuit configuration different from that in FIG. 5 of Embodiment 2 is that a third N-MOS transistor 32, instead of the second N-MOS transistor 28 in FIG. 5, is used as a fourth switching device, whose drain terminal is connected to the circuit power supply 5 for supplying the supply voltage ($V_{CC}$), whose gate terminal is connected to the drain terminal of the first N-MOS transistor 27, and whose source terminal is connected to the non-inverting input terminal of the comparator 1. Other members are the same as or equivalent to those represented in FIG. 5 of Embodiment 2; therefore, the same symbols are given thereto, and the explanation is omitted.

Accordingly, a reference-voltage circuit 2F is to be configured with the first resistor 6 one end of which is connected to the circuit power supply 5, and the other end of which is connected to the non-inverting terminal of the comparator 1, the first Zener diode 7 whose anode is grounded, and whose cathode is connected to the non-inverting input terminal of the comparator 1, the sixth and seventh resistors 24 and 25 that are connected in series between the non-inverting input terminal of the comparator 1 and ground, the eighth resistor 26 one end of which is connected to the circuit power supply 5, the first N-MOS transistor 27 whose drain terminal is connected to the other end of the eighth resistor 26, whose gate terminal is connected between the sixth and seventh resistors 24 and 25, and whose source terminal is grounded, and the third N-MOS transistor 32 whose drain terminal is connected to the circuit power supply 5, whose gate terminal is connected to the drain terminal of the first N-MOS transistor 27, and whose source terminal is connected to the non-inverting input terminal of the comparator 1.

Moreover, a monitor-voltage circuit 3F is configured with the fourth resistor 22 one end of which is connected to the circuit power supply 5 and the other end of which is connected to the inverting input terminal of the comparator 1, and the fifth resistor 23 one end of which is grounded and the other end of which is connected to the inverting input terminal of the comparator 1.

In such an undervoltage lockout circuit, the first N-MOS transistor 27 and the third N-MOS transistor 32 constituting the reference-voltage circuit 2F are set so that, due to a voltage value divided by the sixth and seventh resistors 24 and 25 when the supply voltage increases, until supply voltage reaches the Zener breakdown voltage of the first Zener diode 7, the first N-MOS transistor 27 is switched to the off state and the third N-MOS transistor 32 is switched to the on state, and that, after having reached the Zener breakdown voltage of the first Zener diode 7, the first N-MOS transistor 27 is switched to the on state and the third N-MOS transistor 32 is switched to the off state.

Figure 11:
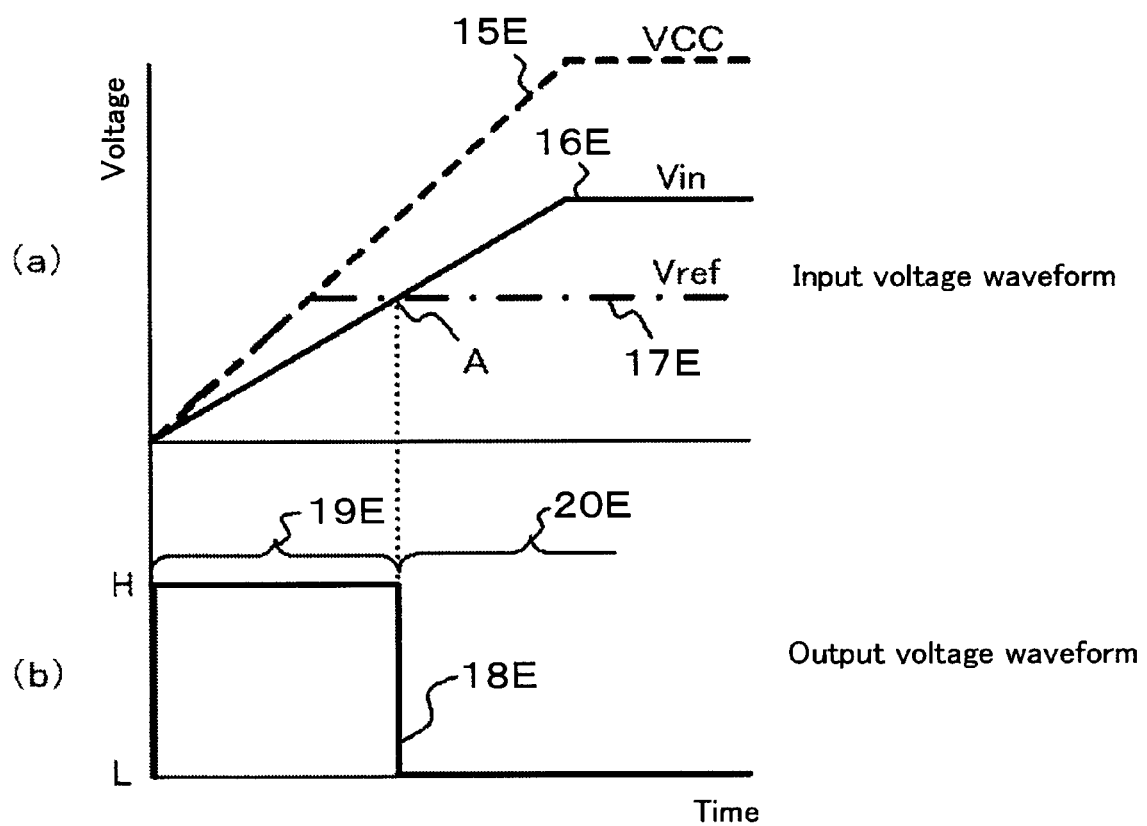
FIG. 11 is an explanatory graph illustrating input/output waveforms of the comparator, when the supply voltage from the circuit power supply provided in the undervoltage lockout circuit according to Embodiment 5 of the present invention steeply increases.
Figure 12:
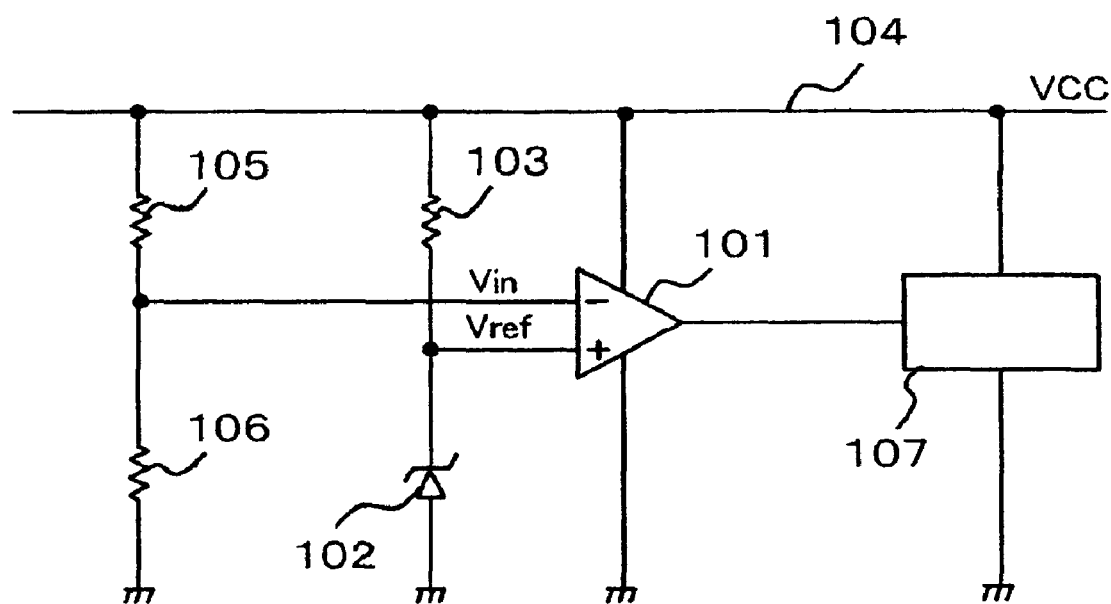
FIG. 12 is a circuit diagram illustrating a conventional undervoltage lockout circuit.
Figure 13:
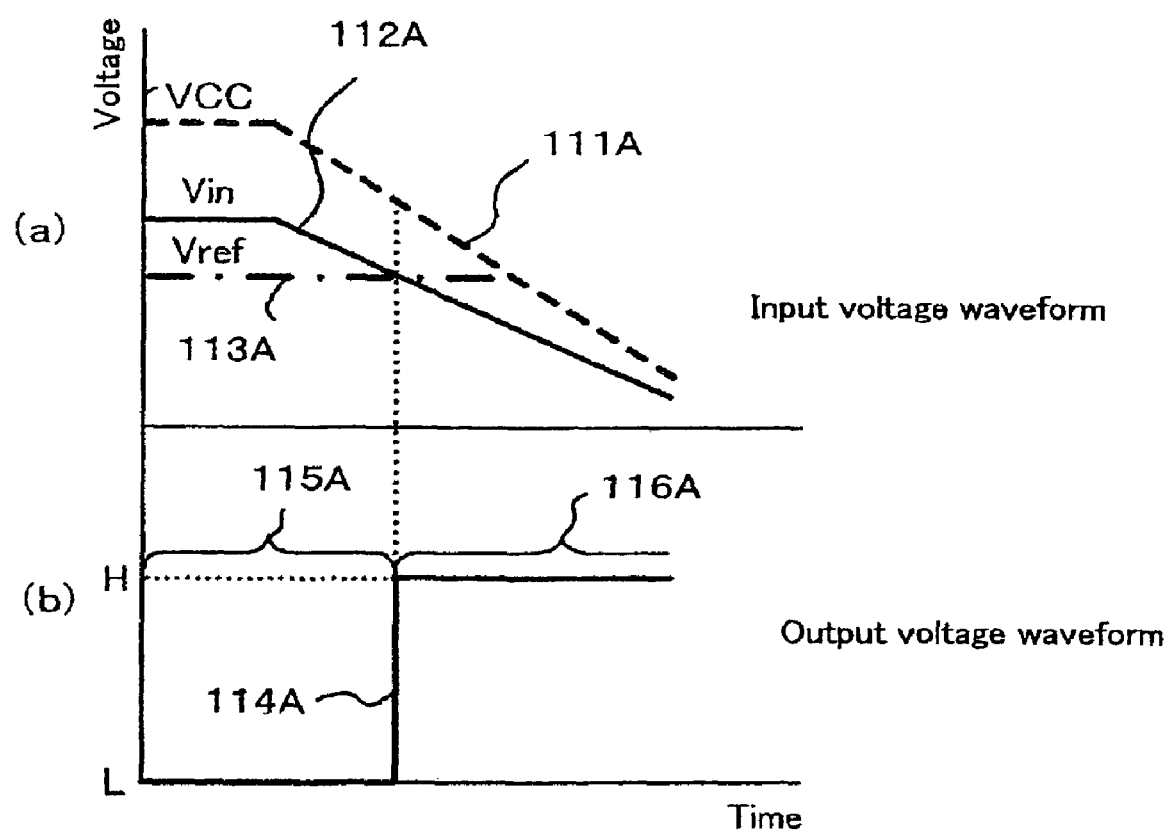
FIG. 13 is an explanatory graph illustrating input/output waveforms of the comparator, when the supply voltage from the circuit power supply provided in the conventional undervoltage lockout circuit decreases.

FIG. 11 is an explanatory graph illustrating input/output waveforms of the comparator 1 when the supply voltage from the circuit power supply 5 steeply increases. In FIG. 11, the same symbols are given to members that are the same as or equivalent to those represented in FIG. 6. In FIG. 11, input voltage waveforms inputted into the comparator 1 are represented in (a), and an output voltage waveform outputted from the comparator 1 is represented in (b). Among the input voltage waveforms (a), symbol 15E denotes a supply voltage ($V_{CC}$) of the circuit power supply 5. Symbol 16E denotes a monitor voltage ($V_{in}$) inputted into the inverting input terminal of the comparator 1. Symbol 17E denotes a reference voltage ($V_{ref}$) inputted into the non-inverting input terminal of the comparator 1. Next, in the output voltage waveform (b), symbol 18E denotes an H/L signal outputted from the comparator 1 in response to the input voltage waveforms (a). Regarding this H/L signal, the L signal as a low-voltage state or the H signal as a high-voltage state outputted according to comparison results between the reference voltage inputted into the non-inverting input terminal and the monitor voltage inputted into the inverting input terminal is outputted.

By referring to the input/output waveforms of the comparator 1, represented in FIG. 11, an operation when the supply voltage 15E of the circuit power supply 5 steeply increases is explained. After power on, if the supply voltage 15E steeply increases at a rate of approximately several-ten V/μsec, specifically, approximately at 50 V/μsec, because a certain time is required for charging the pn-junction capacitance of the first Zener diode 7, in a short time (within several μsec) just after the supply voltage 15E has started to increase, the reference voltage 17E inputted from the reference-voltage circuit 2F into the non-inverting input terminal of the comparator 1 cannot follow the steep increase. The potential increasing rate at this time is determined by a time constant based on the capacitance of the first Zener diode 7, the first resistor 6, the sixth resistor 24, and the seventh resistor 25. However, during a period just after the supply voltage 15E has started to increase until the reference voltage reaches the Zener breakdown voltage of the first Zener diode 7, the first N-MOS transistor 27 is switched to the off state, and the third N-MOS transistor 32 is switched to the on state due to the potential of its gate terminal increasing up to the supply voltage 15E through the eighth resistor 26; accordingly, the pn-junction capacitance of the first Zener diode 7 is directly and steeply charged up. Therefore, even when just after the supply voltage 15E has started to increase, the reference voltage 17E can follow the steep increase of the supply voltage 15E without any time delay. Accordingly, the monitor voltage 16E can never exceed the reference voltage 17E. After the supply voltage has reached the Zener breakdown voltage of the first Zener diode 7, the first N-MOS transistor 27 is switched to the on state, and the third N-MOS transistor 32 is switched to the off state due to the potential of its gate terminal being at the ground level (0 V). Then, the reference voltage 17E becomes constant at the Zener breakdown voltage of the first Zener diode 7. For example, as represented in Embodiment 1, assuming that the Zener breakdown voltage of the first Zener diode 7 is 6 V, after the reference voltage 17E has increased, approximately along the increase of the supply voltage 15E, up to 6 V that is the Zener breakdown voltage, the voltage becomes constant.

Moreover, the monitor voltage 16E increases, without any time delay, with a voltage obtained by dividing the supply voltage 15E by the fourth and fifth resistors 22 and 23. For example, as represented in Embodiment 1, assuming that the values of the fourth resistor 22 and the fifth resistor 23 are equal to each other, and that the supply voltage 15E is set to be 15 V in a steady state, the monitor voltage 16E increases up to 7.5 V that is half of the supply voltage 15E, and then becomes constant.

As described above, during the period just after the supply voltage 15E has started to increase until the reference voltage reaches the Zener breakdown voltage of the first Zener diode 7, by switching the first N-MOS transistor 27 to the off state, and the third N-MOS transistor 32 to the on state, because the pn-junction capacitance of the first Zener diode 7 is directly and steeply charged up, the output-unblocked region 117 that occurs in a short time just after the supply voltage 15E has started to increase is removed. Accordingly, during the period just after the supply voltage 15E has started to increase until the monitor voltage 16E reaches the reference voltage 17E, where this point is indicated by "A" in FIG. 11, because the monitor voltage 16E is necessarily lower than the reference voltage 17E, the H signal is outputted as an H/L signal 18E from the comparator 1. During the H signal is inputted, the output block circuit 4 blocks output from the gate driver (represented as an output block region 19E in FIG. 11). After the monitor voltage 16E has reached the reference voltage 17E, because the monitor voltage 16E exceeds the reference voltage 17E, the L signal is outputted as the H/L signal 18E from the comparator 1. During the L signal is inputted, the output block circuit 4 permits output from the gate driver (represented as an output enable region 20E in FIG. 11). Accordingly, even when the supply voltage ($V_{CC}$) from the circuit power supply 5 steeply increases, block and permission of the gate-driver output can be stably performed.

Here, in the above explanation, a case has been explained in which the supply voltage from the circuit power supply 5 is steeply increased; however, when the supply voltage from the circuit power supply 5 gradually increases, because the reference voltage 17E follows the increase of the supply voltage 15E without any time delay, the monitor voltage 16E can never exceed the reference voltage 17E; therefore, the output from the gate driver can also be stably blocked and permitted.

According to this Embodiment 5, the undervoltage lockout circuit has been configured in such a way that, during the period just after the supply voltage 15E has started to increase until the reference voltage reaches the Zener breakdown voltage of the first Zener diode 7, the first N-MOS transistor 27 is switched to the off state, and the third N-MOS transistor 32 is switched to the on state, and that, after the reference voltage having reached the Zener breakdown voltage of the first Zener diode 7, the first N-MOS transistor 27 is switched to the on state, and the third N-MOS transistor 32 is switched to the off state; therefore, even if the supply voltage from the circuit power supply 5 steeply increases, the output-unblocked region 117 can be removed that has occurred in the short time just after the supply voltage 15E has started to increase. Therefore, normal output block and output permission of the gate driver can be realized. Accordingly, a highly-reliable undervoltage lockout circuit can be obtained.

Here, according to Embodiments 2-5, as the switching devices for realizing the on and off states, N-MOS transistors, P-MOS transistors and NPN transistors are used; however, this is only an example, and it is needless to say that any switching device can be used as long as the device can operate as in each embodiment based on the voltage value divided by the sixth and seventh resistors 24 and 25, which is obviously within the scope of the present invention; therefore, an effect according to the present invention can also be obtained.

What is claimed is:

1. An undervoltage lockout circuit comprising:
a reference-voltage circuit that outputs a reference voltage;
a monitor-voltage circuit that outputs a monitor voltage; and
a comparator that outputs, based on the reference voltage and the monitor voltage inputted thereinto, a high or low signal, corresponding to a comparison result of the reference voltage and the monitor voltage,
wherein the monitor-voltage circuit includes a zener diode whose break down voltage is higher than a voltage of the monitor voltage, and a monitor-voltage circuit time constant that determines an increasing rate of the monitor voltage is higher than a reference-voltage circuit time constant that determines an increasing rate of the reference voltage.

2. An undervoltage lockout circuit comprising:
a reference-voltage circuit that outputs a reference voltage;
a monitor-voltage circuit that outputs a monitor voltage; and
a comparator that outputs, based on the reference voltage and the monitor voltage inputted thereinto, a high or low signal, corresponding to a comparison result of the reference voltage and the monitor voltage,
wherein a monitor-voltage circuit time constant that determines an increasing rate of the monitor voltage is higher than a reference-voltage circuit time constant that determines an increasing rate of the reference voltage,
the reference-voltage circuit includes a first resistor one end of which is connected to a circuit power supply that supplies a supply voltage and another end of which is connected to a non-inverting input terminal of the comparator, and a first Zener diode whose anode is grounded and whose cathode is connected to the non-inverting input terminal of the comparator;
the monitor-voltage circuit includes a second resistor one end of which is connected to the circuit power supply and another end of which is connected to an inverting input terminal of the comparator, a third resistor one end of which is grounded and another end of which is connected to the inverting input terminal of the comparator, and a second Zener diode connected in series to a third Zener diode, and a fourth Zener diode connected in series to a fifth Zener diode, wherein cathodes of the second and the fourth Zener diodes are connected to the inverting input terminal of the comparator, and anodes of the third and the fifth Zener diodes are grounded;
a value of the second resistor is equal to that of the third resistor, and a combined value of the second and the third resistors is higher than that of the first resistor; and
each Zener breakdown voltage of the second, the third, the fourth and the fifth Zener diodes is equal to that of the first Zener diode.

3. An undervoltage lockout circuit comprising:
a reference-voltage circuit that outputs a reference voltage;
a monitor-voltage circuit that outputs a monitor voltage; and
a comparator that outputs, based on the reference voltage and the monitor voltage inputted thereinto, a high or low signal, corresponding to a comparison result of the reference voltage and the monitor voltage,
wherein a monitor-voltage circuit time constant that determines an increasing rate of the monitor voltage is higher than a reference-voltage circuit time constant that determines an increasing rate of the reference voltage,
the reference-voltage circuit includes a first resistor one end of which is connected to a circuit power supply that supplies a supply voltage and another end of which is connected to a non-inverting input terminal of the comparator, and a first Zener diode whose anode is grounded and whose cathode is connected to the non-inverting input terminal of the comparator;
the monitor-voltage circuit includes a second resistor one end of which is connected to the circuit power supply and another end of which is connected to an inverting input terminal of the comparator, a third resistor one end of which is grounded and another end of which is connected to the inverting input terminal of the comparator, and a second Zener diode whose cathode is connected to the inverting input terminal of the comparator and whose anode is grounded; and
a combined resistance value determined by the second resistor and the third resistor is higher than that of the first resistor, and a Zener breakdown voltage of the second Zener diode is higher than a maximum value of the monitor voltage.

4. An undervoltage lockout circuit comprising:
a reference-voltage circuit that outputs a reference voltage;
a monitor-voltage circuit that outputs a monitor voltage; and
a comparator that outputs, based on the reference voltage and the monitor voltage inputted thereinto, a high or low signal, corresponding to a comparison result of the reference voltage and the monitor voltage,
wherein the reference-voltage circuit includes a first resistor one end of which is connected to a circuit power supply that supplies a supply voltage and another end of which is connected to the non-inverting input terminal of the comparator, a first Zener diode whose anode is grounded and whose cathode is connected to a non-inverting input terminal of the comparator, and a second and a third resistor connected in series to each other between the non-inverting input terminal of the comparator and ground,
the monitor-voltage circuit includes a fourth resistor one end of which is connected to the circuit power supply and another end of which is connected to an inverting input terminal of the comparator, a fifth resistor one end of which is grounded and another end of which is connected to the inverting input terminal of the comparator, a sixth resistor one end of which is connected to the circuit power supply, a first switching device, provided between another end of the sixth resistor and the ground, that performs an on-off operation based on a voltage value divided by the second resistor and the third resistor; and a second switching device, provided between the inverting input terminal of the comparator and the ground, that performs an on-off operation based on the on-off operation of the first switching device, and the first switching device is switched to an off state and the second switching device is switched to an on state until the reference voltage reaches a Zener breakdown voltage of the first Zener diode, and the first switching device is switched to an on state and the second switching device being switched to an off state after the reference voltage has reached the Zener breakdown voltage of the first Zener diode.

5. The undervoltage lockout circuit as recited in claim 4, wherein
the first switching device is a first N-MOS transistor whose drain terminal is connected to the sixth resistor, whose gate terminal is connected between the second resistor and the third resistor, and whose source terminal is grounded; and
the second switching device is a second N-MOS transistor whose drain terminal is connected to the inverting input terminal of the comparator, whose gate terminal is connected to the drain terminal of the first N-MOS transistor, and whose source terminal is grounded.

6. The undervoltage lockout circuit as recited in claim 4, wherein
the first switching device is a first NPN transistor whose collector terminal is connected to the sixth resistor, whose base terminal is connected between the second resistor and the third resistor, and whose emitter terminal is grounded; and
the second switching device is a second NPN transistor whose collector terminal is connected to the inverting input terminal of the comparator, whose base terminal is connected to the collector terminal of the first NPN transistor, and whose emitter terminal is grounded.

7. An undervoltage lockout circuit comprising:
a reference-voltage circuit that outputs a reference voltage;
a monitor-voltage circuit that outputs a monitor voltage; and
a comparator that outputs, based on the reference voltage and the monitor voltage inputted thereinto, a high or low signal, corresponding to a comparison result of the reference voltage and the monitor voltage,
wherein the reference-voltage circuit includes a first resistor one end of which is connected to a circuit power supply that supplies a supply voltage and another end of which is connected to a non-inverting input terminal of the comparator, a first Zener diode whose anode is grounded and whose cathode is connected to the non-inverting input terminal of the comparator, and a second and third resistors connected in series to each other between the non-inverting input terminal of the comparator and ground,
the monitor-voltage circuit in includes a fourth resistor one end of which is grounded and another end of which is connected to an inverting input terminal of the comparator, a fifth resistor one end of which is connected to the circuit power supply, a first switching device, provided between another end of the fifth resistor and the ground, that performs an on-off operation based on a voltage value divided by the second resistor and the third resistor, a sixth resistor one end of which is connected to the inverting input terminal of the comparator, and a second switching device, provided between another end of the sixth resistor and the circuit power supply, that performs an on-off operation based on the on-off operation of the first switching device, and
the first switching device is switched to an off state and the second switching device is switched to an off state until the reference voltage reaches the Zener breakdown voltage of the first Zener diode, and the first switching device is switched to an on state and the second switching device is switched to an on state after the reference voltage has reached the Zener breakdown voltage of the first Zener diode.

8. The undervoltage lockout circuit as recited in claim 7, wherein
the first switching device is a first N-MOS transistor whose drain terminal is connected to the fifth resistor, whose gate terminal is connected between the second resistor and the third resistor, and whose source terminal is grounded; and
the second switching device is a first P-MOS transistor whose source terminal is connected to the circuit power supply, whose gate terminal is connected to the drain terminal of the first N-MOS transistor, and whose drain terminal is connected to the sixth resistor.

9. An undervoltage lockout circuit comprising:
a reference-voltage circuit that outputs a reference voltage;
a monitor-voltage circuit that outputs a monitor voltage; and
a comparator that outputs, based on the reference voltage and the monitor voltage inputted thereinto, a high or low signal, corresponding to a comparison result of the reference voltage and the monitor voltage,
wherein the reference-voltage circuit includes a first resistor one end of which is connected to a circuit power supply that supplies a supply voltage and another end of which is connected to a non-inverting input terminal of the comparator, a first Zener diode whose anode is grounded and whose cathode is connected to the non-inverting input terminal of the comparator, a second resistor and a third resistor connected in series to each other between the non-inverting input terminal of the comparator and ground, a fourth resistor one end of which is connected to the circuit power supply, a first switching device, provided between another end of the fourth resistor and the ground, that performs an on-off operation based on a voltage value divided by the second resistor and the third resistor, and a second switching device, provided between the circuit power supply and the non-inverting input terminal of the comparator, that performs an on-off operation based on the on-off operation of the first switching device,
the monitor-voltage circuit includes a fifth resistor one end of which is connected to the circuit power supply and another end of which is connected to an inverting input terminal of the comparator, and a sixth resistor one end of which is grounded and another end of which is connected to the inverting input terminal of the comparator, and
the first switching device is switched to an off state and the second switching device is switched to an on state until the reference voltage reaches the Zener breakdown voltage of the first Zener diode, and the first switching device is switched to an on state and the second switching device is switched to an off state after the reference voltage reaches the Zener breakdown voltage of the first Zener diode.

10. The undervoltage lockout circuit as recited in claim 9, wherein
the first switching device is a first N-MOS transistor whose drain terminal is connected to the fourth resistor, whose gate terminal is connected between the second resistor and the third resistor, and whose source terminal is grounded; and the second switching device is a second N-MOS transistor whose drain terminal is connected to the circuit power supply, whose gate terminal is connected to the drain terminal of the first N-MOS transistor, and whose source terminal is connected to the non-inverting input terminal of the comparator.

11. The undervoltage lockout circuit as recited in any one of claims 1-10, further comprising an output block circuit that performs block or permission of a gate driver, based on the high or low signal, outputted from the comparator, being inputted thereinto.

* * * * *